(12) United States Patent
Noji

(10) Patent No.: US 7,620,305 B2
(45) Date of Patent: Nov. 17, 2009

(54) ACTUATOR, AND LEANS UNIT AND CAMERA WITH THE SAME

(75) Inventor: Takayoshi Noji, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 155 days.

(21) Appl. No.: 11/240,445

(22) Filed: Oct. 3, 2005

(65) Prior Publication Data

US 2006/0072913 A1 Apr. 6, 2006

(30) Foreign Application Priority Data

Oct. 1, 2004 (JP) .............................. 2004-290059

(51) Int. Cl.
*G03B 17/00* (2006.01)
*H04N 5/228* (2006.01)

(52) U.S. Cl. ..................... 396/55; 348/208.99

(58) Field of Classification Search .................. 396/13, 396/52, 55, 421; 348/208.99, 208.4, 208.7, 348/208.11; 359/557, 702
See application file for complete search history.

(56) References Cited

U.S. PATENT DOCUMENTS

| | | | |
|---|---|---|---|
| 4,731,669 A * | 3/1988 | Hayashi et al. | 348/208.7 |
| 5,012,347 A * | 4/1991 | Fournier | 348/208.2 |
| 5,155,520 A | 10/1992 | Nagasaki et al. | |
| 5,835,799 A * | 11/1998 | Washisu | 396/55 |
| 6,064,827 A | 5/2000 | Toyoda | |
| 6,400,902 B1 * | 6/2002 | Usui | 396/55 |
| 6,456,444 B1 | 9/2002 | Yumiki et al. | |
| 6,631,042 B2 * | 10/2003 | Noguchi | 359/823 |
| 6,718,131 B2 * | 4/2004 | Okazaki et al. | 396/55 |

FOREIGN PATENT DOCUMENTS

| | | |
|---|---|---|
| JP | 03-186823 | 8/1991 |
| JP | 06-242485 | 9/1994 |
| JP | 10-260013 | 9/1998 |
| JP | 2000194027 A | 7/2000 |
| JP | 2000330153 A | 11/2000 |
| JP | 2002229090 | 8/2002 |
| JP | 2005184122 A | 7/2005 |
| JP | 2006094185 A | 4/2006 |

* cited by examiner

*Primary Examiner*—Rodney E Fuller
(74) *Attorney, Agent, or Firm*—Jacobson Holman PLLC

(57) ABSTRACT

An actuator, and a lens unit and a camera incorporating the actuator. The actuator includes fixed and movable members, a support supporting the movable member to permit its movement in a plane parallel with the fixed member, at least three actuating coils attached to one of the fixed and movable members, actuating magnets attached to the other of the fixed and movable members in positions corresponding to the actuating coils to apply magnetic force thereto to affect each other when current flows therein, a position sensor detecting a relative position of the movable and fixed members, and a controller producing a coil position command signal based on a command signal to instruct where the movable member is to be moved and controlling the drive current to flow in each of the actuating coils in response to the coil position command signal and the position data detected by the position sensor.

14 Claims, 10 Drawing Sheets

ACTUATOR, AND LEANS UNIT AND CAMERA WITH THE SAME

TECHNICAL FIELD

This application claims priority from Japanese Patent application number 2004-290059, filed on Oct. 1, 2004, which are incorporated herein.

The present invention relates to an actuator, and a lens unit and a camera with the same, and more particularly, to an actuator capable of translating in a desired direction in a predetermined plane, and a lens unit and a camera with the same.

BACKGROUND ART

Japanese Patent Preliminary Publication No. H03-186823 (referred to as Patent Document 1 as listed below) discloses an anti-vibration device that is useful to avoid image shaking. The anti-vibration device detects vibration of a lens barrel and analyzes the detected vibration to actuate the correcting lens in a plane in parallel with the film so as not to cause image shaking. In order to translate the correcting lens in a desired direction, the anti-vibrating device employs a fixture frame retaining the correcting lens stationary, a first holder frame movably supporting the fixture frame in a first direction orthogonal to the optical axis, and a second holder frame fixed to the lens barrel and movably supporting the first holder frame in a second direction orthogonal to the optical axis and the first direction. Movements in the first and second directions orthogonal to each other are composed to permit the correcting lens to translate in a desired direction in a plane in parallel with the film relative to the lens barrel. In addition to that, the anti-vibration device has dedicated linear motors actuating the correcting lens in first and second directions respectively, and obtaining a composite displacement with the motors enables the correcting lens to move in the desired direction.

In this way, any of prior art cameras having an anti-image shaking feature employs the similar method that the actuator for the correcting lens has a guide member and a drive means in combination provided in two orthogonal directions, respectively, so as to move the correcting lens in the desired direction where the guide member guides the correcting lens in one direction and the drive means actuates it in the same direction.

REFERENCE

Patent Document 1:
Japanese Patent Preliminary Publication No. H03-186823

DISCLOSURE OF THE INVENTION

Problem to be Solved by the Invention

As has been mentioned above, however, the actuator having the combined guide member and drive means in each of the orthogonal directions are to make its supporting and driving mechanisms undesirably complicated. Such complicated supporting and driving mechanisms lead to a massive movable unit of the actuator, and this results in an adverse effect of poor response at high speed of the actuator. Moreover, in the actuator that uses the guide means provided in each of the orthogonal directions, its movable unit can translate in the desired direction in the predetermined plane but cannot rotate.

Accordingly, it is an object of the present invention to provide an actuator capable of quick response, and a lens unit and a camera with the same.

It is another object of the present invention to provide an actuator having its movable member translatable and rotatable in a desired direction in a predetermined plane, and a lens unit and camera with the same.

Means for Solving Problem

To overcome the aforementioned disadvantages, the actuator according to the present invention is comprised of a fixed member, a movable member, a movable member supporting means for supporting the movable member so as to permit the movable member to move to an arbitrary position in a plane in parallel with the fixed member, at least three actuating coils attached to either one of the fixed member and the movable member, actuating magnets attached to the remaining one of the fixed member and the movable member in positions corresponding to the actuating coils so as to apply magnetic force to the corresponding actuating coils to affect each other when current flows in the actuating coils, a position sensing means detecting a relative position of the movable member to the fixed member, and a control means, in response to a command signal to instruct where the movable member is to be moved, producing a coil position command signal, and controlling the driving current to flow in each of the actuating coils in response to the coil position command signal and the position data detected by the position sensing means.

In the present invention thus configured, the control means receives the command signal to instruct the position where the movable member is to be moved, and produces the coil position command signal related to the actuating coils on the basis of the command signal instructing the position of the movable member. Additionally, the control means controls the drive current to flow in the actuating coils, in response to the coil position command signal and the position data detected by the position sensing means. When electric filed is developed around the actuating coils as a result of the current flowing in the actuating coils, interacting forces are applied between the actuating coils and the corresponding actuating magnets. Such interacting force permits the movable member to move in the plane in parallel with the fixed member. A displacement of the movable member is detected by the position sensing means and the detection result is transferred to the control means.

In the actuator configured in this manner according to the present invention, a combination of a guide member guiding the movable member to some predetermined direction with an actuating means driving the movable member in the same direction are no longer needed, and thus, the resultant movable member can be reduced in weight, thereby attaining a quick response with a simplified mechanism.

In this invention, preferably, the position sensing means may be a magnetic sensor that detects a variation in magnetism, and resides in position corresponding to each of the actuating magnets so as to detect the varied position of each actuating magnet.

Configured in this way according to the present invention, the magnetic sensor located relative to each actuating magnet serves as the position sensing means, and the magnetic sensor detects the position of the corresponding actuating magnet.

With such a configuration, the actuating magnet functions to either way of actuating components and position sensing.

In the present invention, preferably, the magnetic sensor is located inside each of the actuating coils.

In this invention thus configured, a point of action of the force applied from each actuating coil to each actuating magnet is equivalent to a point sensed as the position of the actuating magnet by the magnetic sensor.

With such a configuration according to the present invention, considerably reduced can be an error of the position determination due to mechanical maladjustment caused by some deviation between the point of action of the applied force and the point sensed as the position of the magnet.

In the present invention, preferably, the movable member supporting means is comprised of three spherical members interposed between the opposing faces of the fixed member and the movable member.

In this invention configured in this manner, an interval between the fixed member and the movable member is kept constant by virtue of the spherical members, and the rolling of the spherical members between the fixed and movable member permits the movable member to move relative to the fixed member.

With such a configuration in accordance with the present invention, the movable member can move relative to the fixed member without affections of resistance due to sliding friction.

In the present invention, preferably, each of the actuating magnets is positioned on a predetermined circle, and at least one of the actuating magnets is arranged so that its magnetic neutral axis approximately directed in a radial direction of the circle.

In this invention configured in this manner, by virtue of the magnetic neutral axis of the actuating magnet approximately directed in the radial direction with the predetermined circle, the actuating force of the magnetic field caused by the actuating coil acts in a tangential direction with the circle.

With such a configuration in accordance with the present invention, the actuating force caused by the magnetic filed generated by the actuating coil can efficiently drive the movable member.

In the present invention, preferably, there are three of the actuating coils, and these three actuating coils are disposed on a predetermined circle, each of the actuating coils being angularly away from each other by a central angle ranging from 90 degrees to 180 degrees.

With such a configuration according to the present invention, the actuating force caused by the magnetic field generated by the actuating coil can efficiently drive the movable member in the desired direction.

In the present invention, preferably, there are three of the actuating coils, namely, first, second and third actuating coils, and these three actuating coils are disposed on a circle centered at a predetermined point so that they are angularly separated from each other at central angles of 90 degrees between the first and second actuating coils, (90+$\alpha$) degrees between the second and third actuating coils, and (180−$\alpha$) degrees between the third and first actuating coils where $0 \leq \alpha \leq 90$ is satisfied.

With such a configuration in accordance with the present invention, components of the command signal, which indicate a position to which the movable member is moved and are related to two orthogonal directions, are allocated to the coil position command signals related to the first and second actuating coils, thereby facilitating to generate the coil position command signal.

In the present invention, preferably, the actuating magnets arranged on the predetermined circle in positions corresponding to the actuating coils, so that magnetic neutral axes of the actuating magnets are approximately directed to radial direction of the circle, and the control means, upon receiving the command signal to rotate the movable member, produces the coil position command signal of the same level to the actuating coils so as to permit the movable member to rotate about the center of the circle on which the actuating magnets are disposed.

With such a configuration in accordance with the present invention, the coil position command signal to rotate the movable member can be easily produced.

In the present invention, preferably, the actuating magnets are disposed on a predetermined circle in positions corresponding to the first, second and third actuating coils, so that magnetic neutral axes of the actuating magnets are approximately directed to radial direction of the circle, and the control means, upon receiving the command signal to translate the movable member, produces a coil position command signal $r_X$ related to the first actuating coil, a coil position command signal $r_Y$ related to the second actuating coil, and a coil position command signal $r_t = r_X \cos \alpha - r_Y \sin \alpha$ related to the third actuating coil to induce an only translation motion of the movable member.

With such a configuration in accordance with the present invention, the coil position command signal to translate the movable member can be easily produced.

The actuator according to the present invention is comprised of a fixed member, a movable member, a movable member supporting means for supporting the movable member so as to permit the movable member to move to an arbitrary position in a plane in parallel with the fixed member, and a drive means for translating and rotating the movable member relative to the fixed member.

With such a configuration in accordance with the present invention, the movable member is able to move relative to the fixed member to the desired direction in the plane in parallel with the fixed member while the actuating means is capable of translating and rotating the movable member relative to the fixed member.

Also, with such a configuration, the movable member can be translated and rotated relative to the fixed member.

Additionally, the lens unit according to the present invention is comprised of a lens barrel, a photographing lens housed in the lens barrel, a fixed member secured to the lens barrel, a movable member carrying an image stabilizing lens, a movable member supporting means for supporting the movable member so as to permit the movable member to move to an arbitrary position in a plane in parallel with the fixed member, at least three actuating coils attached to either one of the fixed member and the movable member, actuating magnets attached to the remaining one of the fixed member and the movable member in positions corresponding to the actuating coils for applying magnetic force to the corresponding actuating coils to affect each other when current flows in the actuating coils, a position sensing means detecting a relative position of the movable member to the fixed member, a vibration sensing means detecting vibrations of the lens barrel, a lens position command signal generating means generating a lens position command signal to instruct where an image stabilizing lens is to be moved on the basis of a detection signal from the vibration sensing means, and a control means producing a coil position command signal related to the actuating coils on the basis of the lens position command signal from the lens position command signal generating means and controlling drive current to flow in the actuating coils in response to the coil position command signal and the position information detected by the position sensing means.

With such a configuration in accordance with the present invention, the vibration sensing means detects vibrations of the lens barrel, and the lens position command signal generating means receives the detection result and produces the lens position command signal. The control means, upon receiving the lens position command signal, produces the coil position command signal related to the actuating coils and controls the drive current to flow in the actuating coils in response to the coil position command signal and the position data detected by the position detection means. When the current flowing in the actuating coils develops magnetic field, forces are applied between the actuating coils and the corresponding actuating magnets each other. These forces permit the movable member and the image stabilizing lens mounted thereon to move in the plane in parallel with the fixed member. The current position of the movable member is detected by the position detection means and transferred to the control means.

With such a lens unit configured in accordance with the present invention, no longer needed is a combination of the guide member to guide the movable member to let it move in a specified direction with a drive means actuating the movable member in that direction, and this enables to implement the movable member of the reduced weight. Thus, an image stabilizing mechanism featuring a high-speed response can be attained with a simplified architecture.

Moreover, the lens unit according to the present invention is comprised of a lens barrel, a photographing lens housed in the lens barrel, a fixed member attached to the lens barrel, a movable member carrying an image stabilizing lens, a movable member supporting means for supporting the movable member so as to permit the movable member to move to an arbitrary position in a plane in parallel with the fixed member, and a drive means translating and rotating the movable member relative to the fixed member in the plane in parallel with the fixed member.

With such a configuration in accordance with the present invention, the movable member and the image stabilizing lens can be translated and rotated relative to the fixed member.

Furthermore, the camera a ccording to the present invention has the lens unit according to the present invention.

Effects of the Invention

In accordance with the present invention, provided are an actuator of quick response with a simplified structure, and a lens unit and a camera having the same.

Also, in accordance with the present invention, provided are an actuator capable of translating and rotating a movable member in a desired direction in a predetermined plane, and a lens unit and a camera having the same.

BEST MODE OF THE INVENTOIN

With reference to the accompanying drawings, preferred embodiments of the present invention will be described.

First, referring to FIGS. 1 to 11, an embodiment of a camera according to the present invention will be detailed. FIG. 1 is a sectional view showing the embodiment of the camera according to the present invention.

As can be seen in FIG. 1, the exemplary camera of the present invention denoted by reference numeral 1 comprises a lens unit 2 and a camera body 4. The lens unit 2 includes a lens barrel 6, a plurality of photographing lenses 8 housed in the lens barrel 6, an actuator 10 moving an image stabilizing lens 16 in a predetermined plane, and gyros 34a, 34b respectively serving as vibration sensing means to detect vibrations of the lens barrel 6 (the gyro 34a alone is shown in FIG. 1). The camera 1 uses the gyros 34a, 34b to detect the vibrations, and in response to the detection results, the actuator 10 works to move the image stabilizing lens 16 to obtain a stabilized image focused in a film plane F within the camera body 4. In this embodiment, a piezoelectric vibration gyro is used for the gyros 34a, 34b, respectively. Also, in this embodiment, the image stabilizing lens 16 is made of a piece of lens, and alternatively, it may be of a group of more than one lenses. In this specification, the term of the "image stabilizing lens" covers a piece of lens and a group of lenses used to stabilize an image.

Next, referring to FIGS. 2 to 4, the actuator 10 will be described in detail. FIG. 2 is a frontal partial sectional view of the actuator 10, FIG. 3 is a cross-sectional view taken along the line A-A in FIG. 2, and FIG. 4 is a top partial sectional view of the same. FIG. 2 is a depiction of the actuator 10 viewed on the side of the film plane F in FIG. 1, illustrating a fixed plate 12 partially cut away, and simply for the convenience of understanding, this view is referred to as the "frontal view" hereinafter. As will be recognized in FIGS. 2 to 4, the actuator 10 has the fixed plate 12 or a fixed member secured inside the lens barrel 6, a movable frame 14 or a movable member movably supported relative to the fixed plate, and three steel balls 18 supporting the movable frame 14 and serving as a movable member supporting means. The actuator 10 further has three actuating coils 20a, 20b, 20c attached to the fixed plate 12, three actuating magnets 22 attached to the movable frame 14 in respectively corresponding positions to the actuating coils 20a, 20b, 20c, and magnetic sensors 24a, 24b, 24c, namely, position sensing means disposed inside the actuating coils 20a, 20b, 20c, respectively. The actuator 10 is also provided with attracting yokes 26 mounted on the fixed plate 12 to let the magnetic force of the actuating magnets attract the movable frame 14 to the fixed plate 12, and provided with a back yoke 28 mounted on a reverse side of each of the actuating magnets 22 to effectively direct the magnetic force of the actuating magnets toward the fixed plate 12. The actuator 10 additionally includes an attracting magnet 30 pulling the steel balls 18 onto the movable frame 14 and steel ball contacts 32 mounted on both the fixed plate 12 and the movable frame 14 so as to smoothly roll the steel balls 18 between the fixed plate 12 and the movable frame 14. The actuating coils 20a, 20b, 20c and the actuating magnets 22 disposed in the corresponding positions to them together compose a drive means that enables the movable frame 14 to translate and rotate relative to the fixed plate 12.

Moreover, as shown in FIG. 1, the actuator 10 has a control means or a controller 36 controlling current to flow in the actuating coils 20a, 20b, 20c, respectively on the basis of vibrations detected by the gyros 34a, 34b and the position data of the movable frame 14 sensed by the magnetic sensors 24a, 24b, 24c.

The lens unit 2 is attached to the camera body 4 in order to focus incident light beams and form an image on the film plane F.

The lens barrel 6 shaped approximately in a cylinder holds a plurality of photographing lens 8 inside and allows for part of the photographing lens 8 to move, thereby adjusting a focus.

The actuator 10 causes the movable frame 14 to move in a plane in parallel with the film plane F relative to the fixed plate 12 secured to the lens barrel 6, and this, in turn, causes the image stabilizing lens 16 on the movable frame 14 to move, so as to avoid shaking of the image formed on the film plane F even when the lens barrel 6 is vibrated.

The fixed plate 12 is shaped approximately in a doughnut with three of the actuating coils 20a, 20b, 20c residing thereon. As can be seen in FIG. 2, the actuating coils 20a, 20b, 20c are disposed on a circle having its center identical with the optical axis of the lens unit 2. In this embodiment, the actuating coil 20a is located vertically above the optical axis, the actuating coil 20b is located horizontally along the optical axis, and the actuating coil 20c is located 135 degrees of the central angle away from the actuating coils 20a and 20b, respectively. Thus, adjacent ones of the actuating coils, 20a and 20b, 20b and 20c, and 20c and 20a, are separated from each other by 90 degrees of the central angle, 135 degrees of the central angle, and 135 degrees of the central angle, respectively, in order. The actuating coils 20a, 20b, 20c have their respective windings rounded square in shape, and these coils are disposed so that their respective center lines of the rounded squares are directed to radial direction of the circle on which the coils are disposed.

The movable frame 14 is shaped roughly in a donut and is located in parallel with the fixed plate 12, overlying the same. In a center aperture of the movable frame 14, the image stabilizing lens 16 is fitted. The rectangular actuating magnets 22 are embedded on the circle on the movable frame 14, and disposed in positions corresponding to the actuating coils 20a, 20b, 20c, respectively. In this specification, "positions corresponding to the actuating coils" are referred to as the positions substantially affected by the magnetic field developed by the actuating coils. Each of the actuating magnets 22 has its reverse side provided with a rectangular back yoke 28 so that the magnetic flux from the actuating magnet 22 can be efficiently disposed toward the fixed plate 12.

On a reverse side of each actuating coil on the fixed plate 12, namely, on the opposite side of the movable frame 14, a rectangular attracting yoke 26 is attached. The movable frame 14 is attracted onto the fixed plate 12 due to the magnetic force applying from each actuating magnet 22 onto the corresponding attracting yoke 26. In this embodiment, the magnetic line of force from the actuating magnet 22 efficiently reaches the attracting yoke 26 because the fixed plate 12 is formed of non-magnetic material.

FIG. 5(*a*) is a partial enlarged top plan view showing positional relations among the actuating coil 20a, the corresponding ones of the actuating magnets 22, the back yokes 28, and the attracting yokes 26, and FIG. 5(*b*) is a partial enlarged frontal plan view. As can be seen in FIG. 2 and FIGS. 5(*a*) and 5(*b*), the actuating magnet 22, the back yoke 28, and the attracting yoke 26, which are all shaped in a rectangle, have their respective longer sides extended along one another while having their respective shorter sides similarly extended along one another. Also, the actuating coil 20a has its sides laid in parallel with the longer and shorter sides of the corresponding one of the rectangular back yoke 28. The actuating magnets 22 have their respective magnetic neutral axes C coincide with radii of the circle on which the actuating magnets 22 are disposed. In this manner, the actuating magnets 22 receive the drive force in tangential directions to the circle as the current flows in the corresponding actuating coils. The remaining actuating coils 20b, 20c are laid in the similar positional relations with their respective corresponding ones of the actuating magnets 22, the back yokes 28, and the attracting yokes 26. In this specification, the terms "magnetic neutral axis C" mean the line connecting transit points from one polarity to another dominated by S- and N-poles which are defined as the opposite ends of the actuating magnet 22. Thus, in this embodiment, the magnetic neutral axis C passes the midpoints of the longer sides of the rectangular actuating magnet 22. Also, as shown in FIG. 5(*a*), the actuating magnet 22 has its polarities varied in the depthwise direction as well, where the lower left and the upper right in FIG. 5(*a*) assume the polarity of South (S) while the lower right and the upper left exhibit the polarity of North (N).

As will be recognized in FIGS. 2 to 5, the actuating coils 20a, 20b, 20c respectively surround the magnetic sensors 24a, 24b, 24c. Each of the magnetic sensors has the center of sensitivity S positioned in the magnetic neutral axis C of the actuating magnet 22 when the movable frame 14 is in its neutral position. In this embodiment, a hole element is used for the magnetic sensor.

FIGS. 6 and 7 are diagrams illustrating relations of a displacement of the actuating magnet 22 and a signal generated from the magnetic sensor 24a. As shown in FIG. 6, when the center of sensitivity S of the magnetic sensor 24a is in the magnetic neutral axis C of the actuating magnet 22, the output signal from the magnetic sensor 24 is at a level of naught. As the movable frame 14 is moved along with the actuating magnet 22 thereon to resultantly deviate the center of sensitivity S of the magnetic sensor 24a from the magnetic neutral axis, the output signal from the magnetic sensor 24a varies. As shown in FIG. 6, when the actuating magnet 22 is moved in directions along the X-axis, namely, in the directions orthogonal to the magnetic neutral axis C, the magnetic sensor 24a produces a sinusoidal signal. Thus, when the displacement is minute, the magnetic sensor 24a generates a signal approximately in proportion to the displacement of the actuating magnet 22. In this embodiment, when the displacement of the actuating magnet 22 falls within a range less than 3% of the longer side of the actuating magnet 22, the signal output from the magnetic sensor 24a is approximately in proportion to the distance from the center of sensitivity S of the magnetic sensor 24a to the magnetic neutral axis C. Also, in this embodiment, the actuator 10 effectively works so far as the outputs from the magnetic sensors are approximately in proportion to the distance.

As will be recognized in FIGS. 7(*a*) to 7(*c*), when the magnetic neutral axis C of the actuating magnet 22 lies in the center of sensitivity S of the magnetic sensor 24a, the output signal from the magnetic sensor 24a is at the level of naught either in the case of FIG. 7(*b*) where the actuating magnet 22 is rotated or in the case of FIG. 7(*c*) where the actuating magnet 22 is moved in directions along the magnetic neutral axis C. Moreover, as shown in FIGS. 7(*d*) to 7(*f*), when the magnetic neutral axis C of the actuating magnet 22 deviates from the center of sensitivity S of the magnetic sensor 24a, a signal output from the magnetic sensor 24a is that which is in proportion to a radius r of a circle of which center is equivalent to the center of sensitivity S and with which the magnetic neutral axis C of the actuating magnet 22 is tangential. Thus, for the identical radius r of the circle to which the magnetic neutral axis C of the actuating magnet 22 is tangential, signals at the same level are produced from the magnetic sensor 24a in any of the cases as in FIG. 7(*d*) where the actuating magnet 22 is moved in the directions orthogonal to the magnetic neutral axis C, as in FIG. 7(*e*) where the actuating magnet 22 is translated and rotated, and as in FIG. 7(*f*) where the actuating magnet 22 is translated in an arbitrary direction.

Although embodiments in terms of the magnetic sensor 24a has been described herein, the remaining magnetic sensors 24b, 24c produce the similar signals under positional relations with the corresponding actuating magnets 22, as well. Hence, analyzing the signals detected by the magnetic sensors 24a, 24b, 24c, respectively, enables to specify the position of the movable frame 14 relative to the fixed plate 12 after the translation and rotation movements.

As can be seen in FIG. 2, three of the steel balls 18 are disposed on the outer circle from the one on which the actuating coils of the fixed plate 12 are disposed. The steel balls 18 are separated from each other at an interval of 120-degree central angle, with one of the steel balls 18 being disposed between the actuating coils 20a and 20b. As depicted in FIG. 3, the steel balls 18 are attracted to the movable frame 14 by virtue of the attracting magnets 30 embedded in positions corresponding to the steel balls 18, respectively. The steel balls 18 are thus attracted to the movable frame 14 by the attracting magnets 30 while the movable frame 14 is attracted to the fixed plate 12 by the activating magnets 22, and resultantly, the steel balls 18 are sandwiched between the fixed plate 12 and the movable frame 14. This enables the movable frame 14 to be supported in the plane in parallel with the fixed plate 12, and the rolling of the steel balls 18 held between these two members permits the movable frame 14 to translate and rotate relative to the fixed plate 12 in an arbitrary direction.

The steel ball contacts 32 are mounted on both the fixed plate 12 and the movable frame 14 in their respective outer peripheries. When the movable frame 14 is moved with the steel balls 18 being sandwiched between the fixed plate 12 and the movable frame 14, the steel balls 18 roll on the steel ball contacts 32. Thus, the relative movement of the movable frame 14 to the fixed plate 12 would not cause friction due to either of the members sliding on each other. Preferably, the steel ball contacts 32 are finished in smooth surfaces and made of material having high surface hardness so as to reduce resistance of the steel balls 18 to the steel ball contacts 32 due to the rolling of the steel balls.

Furthermore, in this embodiment, the steel ball contacts 32 are made of non-magnetic material so that magnetic line of force from the attracting magnet 30 efficiently reaches the steel balls 18. Also, in this embodiment, although the steel spheres are used for the steel balls 18, they are not necessarily spherical objects. Thus, they can be replaced with any alternatives that have their respective contact surfaces with the steel ball contacts 32 generally spherical. Such forms are referred to as a spherical member in this specification.

Then, referring to FIG. 8, the control of the actuator 10 will be described. FIG. 8 is a block diagram showing system architecture for the signal processing in a controller 36. As can be seen in FIG. 8, vibrations of the lens unit 2 is detected by two of the gyros 34a, 34b momentarily, and the detection results are transferred to lens position command signal generating means or arithmetic operation circuits 38a, 38b built in the controller 36. In this embodiment, the gyro 34a is adapted to sense an angular acceleration of the yaw motion of the lens unit 2 while the gyro 34b is adapted to sense the angular acceleration of the pitching motion of the lens unit.

The arithmetic operation circuits 38a, 38b, upon receiving the angular acceleration from the gyros 34a, 34b momentarily, produce command signals instructing the time-varying position to which the image stabilizing lens 16 is to be moved. Specifically, the arithmetic operation circuit 38a twice integrates the angular acceleration of the yawing motion detected by the gyro 34a in the time quadrature process and adds a predetermined correction signal to obtain a horizontal component of the lens position command signal, and similarly, the arithmetic operation circuit 38b arithmetically produces a vertical component of the lens position command signal from the angular acceleration of the pitching motion detected by the gyro 34b. The lens position command signal obtained in this manner is used to time-varyingly move the image stabilizing lens 16, so that an image focused on the film plane F within the camera body 4 is shaken but stabilized even when the lens unit 2 is vibrated during exposure to light in taking a picture.

A coil position command signal producing means built in the controller 36 is adapted to produce coil position command signals associated to each actuating coils on the basis of the lens position command signal generated by the arithmetic operation circuits 38a, 38b. The coil position command signal is the one which indicates the positional relation between the actuating coils 20a, 20b, 20c and their respective corresponding actuating magnets 22 in the case that the image stabilizing lens 16 is moved to the position designated by the lens position command signal. Specifically, when the actuating magnets 22 in pairs with their respective actuating coils are moved to the positions designated by coil position command signals, the image stabilizing lens 16 is moved to the position where the lens position command signal instructs to move to. In this embodiment, since the actuating coil 20a is vertically above the optical axis, the coil position command signal related to the actuating coil 20a is equivalent to the horizontal component of the lens position command signal produced from the arithmetic operation circuit 38a. Also, since the actuating coil 20b is positioned lateral to the optical axis, the coil position command signal related to the actuating coil 20b is equivalent to the vertical component of the lens position command signal produced from the arithmetic operation circuit 38b. Moreover, the coil position command signal related to the actuating coil 20c is produced from coil position command signal producing means or the arithmetic operation circuit 40 on the basis of both the horizontal and vertical components of the lens position command signal.

On the other hand, a displacement of the actuating magnet 22 relative to the actuating coil 20a, which is determined by the magnetic sensor 24a, is amplified at a predetermined magnification by a magnetic sensor amplifier 42a. A differential circuit 44a allows for the current to flow in the actuating coil 20a at the rate in proportion to the difference between the horizontal component of the coil position command signal from the arithmetic operation circuit 38a and the displacement of the actuating magnet 22 in a pair with the actuating coil 20a from the magnetic sensor amplifier 42a. Thus, as the difference between the coil position command signal and the output from the magnetic sensor amplifier 42a is naught, no current flows in the actuating coil 20a, which results in the force activating the actuating magnet 22 also becoming naught.

Similarly, the displacement of the actuating magnet 22 relative to the actuating coil 20b, which is determined by the magnetic sensor 24b, is amplified at a predetermined magnification by a magnetic sensor amplifier 42b. A differential circuit 44b allows for the current to flow in the actuating coil 20b at the rate in proportion to the difference between the vertical component of the coil position command signal from the arithmetic operation circuit 38b and the displacement of the actuating magnet 22 in a pair with the actuating coil 20b from the magnetic sensor amplifier 42b. Thus, as the difference between the coil position command signal and the output from the magnetic sensor amplifier 42b is naught, no current flows in the actuating coil 20b, which results in the force activating the actuating magnet 22 also becoming naught.

Also similarly, the displacement of the actuating magnet 22 relative to the actuating coil 20c, which is determined by the magnetic sensor 24c, is amplified at a predetermined magnification by a magnetic sensor amplifier 42c. A differential circuit 44c allows for the current to flow in the actuating coil 20c at the rate in proportion to the difference between the coil position command signal from the arithmetic operation circuit 40 and the displacement of the actuating magnet 22 in a pair with the actuating coil 20c from the magnetic sensor amplifier 42c. Thus, as the difference between the coil position command signal and the output from the magnetic sensor amplifier 42c is naught, no current flows in the actuating coil 20c, which results in the force activating the actuating magnet 22 also becoming naught.

With reference to FIG. 9, described now will be the relation of the lens position command signal with the coil position command signal in the case of translating the movable frame 14. FIG. 9 is a diagram depicting positional relations of the actuating coils 20a, 20b, 20c disposed on the fixed plate 12 with three of the actuating magnets 22 deployed on the movable frame 14. First, three of the actuating coils 20a, 20b, 20c are respectively located in points L, M, N on a circle of a radius R with its center coinciding with the origin (or the point zero) Q of the coordinate system. The magnetic sensors 24a, 24b, 24c are also located in such a manner that their respective centers S of sensitivity are coincident with the points L, M, N, respectively. When the movable frame 14 is in a neutral position, or when the center of the image stabilizing lens 16 is in the optical axis, the midpoints of the magnetic neutral axes C of the actuating magnets 22 in pairs with the actuating coils are also coincident with the points L, M, N, respectively. Assuming that the horizontal axis X and the vertical axis Y having the origin Q in common respectively meet another axis V at 135 degrees at the origin, the actuating magnets have their respective magnetic neutral axes C coinciding with the X-, Y-, and V-axes, respectively.

Then, when the movable frame 14 is moved to cause the center of the image stabilizing lens 16 to shift to a point $Q_1$ and is further moved in the counterclockwise direction by an angle θ about the point $Q_1$, the midpoints of the magnetic neutral axes C of the actuating magnets 22 are shifted to points $L_1$, $M_1$, $N_1$, respectively. In order to shift the movable frame 14 to such a position, it is required that the coil position command signals related to the actuating coils 20a, 20b, 20c should have their respective signal levels in proportion to radii of circles which have their respective centers coinciding with the points L, M, N, respectively, and which circles are tangential to lines $Q_1L_1$, $Q_1M_1$, $Q_1N_1$, respectively. Those radii of the circles are denoted by $r_X$, $r_Y$, $r_V$, respectively.

Positive and negative conditions of the coil position command signals $r_X$, $r_Y$, $r_V$ are determined as depicted in FIG. 9. Specifically, the coil position command signal $r_X$, which is to shift the point $L_1$ to the first quadrant, is positive, while the same that is to shift to the second quadrant is negative, and similarly, the command signal $r_Y$, which is to shift the point $M_1$ to the first quadrant, is positive while the same that is to shift to the fourth quadrant is negative. In addition to that, the coil position command $r_V$, which is to shift the point $N_1$ below the V-axis, is determined as positive, while the same that is to shift above the V-axis is negative. As with positive and negative conditions for angles, the clockwise direction is given a positive sign. Thus, if the movable frame 14 is rotated from the neutral position in the clockwise direction, the coil position command signals $r_X$, $r_Y$, $r_V$ assume positive, negative, and negative, respectively.

Also, it is now assumed that the coordinates of the point $Q_1$, $L_1$, $N_1$ are (j, g), (i, e) and (k, h), respectively, and that the V- and Y-axes meet at an angle α. Furthermore assumed is that there is an intersection P of an auxiliary line A passing the point M and in parallel with the line $Q_1L_1$ with another auxiliary line B passing the point L and in parallel with the line $Q_1M_1$.

Applying now the law of sines to a right triangle LMP, the following equations are given:

$$\frac{\overline{LP}}{\sin(45°+\theta)} = \frac{\overline{MP}}{\sin(45°-\theta)} = \frac{\sqrt{2}R}{\sin 90°} = \sqrt{2}R \qquad (1)$$

From the above equations, obtained are the following formulae:

$$\overline{LP}=R(\cos\theta+\sin\theta) \qquad (2)$$

$$\overline{MP}=R(\cos\theta-\sin\theta) \qquad (3)$$

The coordinates e, g, h, i, j, and k are respectively expressed by using the terms R, $r_X$, $r_Y$, $r_V$, θ, and α, as follows:

$e=-r_x \sin\theta+R$ $g=e-(\overline{MP}-r_Y)\cos\theta=-r_X\sin\theta+r_Y\cos\theta-R\cos\theta(\cos\theta-\sin\theta)+R$ $h=-R\cos\alpha-r_V\sin(\alpha+\theta)$ $i=r_X\cos\theta$ $j=i-(\overline{MP}-r_Y)\sin\theta=r_X\cos\theta+r_Y\sin\theta-R\sin\theta(\cos\theta-\sin\theta)$ $k=-R\sin\alpha+r_V\cos(\alpha+\theta) \qquad (4)$ As to a right triangle with the apexes of the coordinates (k, g), (j, g), and (k, h), a relation established can be expressed as in the following equations:

$$\frac{j-k}{g-h} = \tan(\alpha+\theta) = \frac{\sin(\alpha+\theta)}{\cos(\alpha+\theta)} = \frac{\sin\alpha\cos\theta+\cos\alpha\sin\theta}{\cos\alpha\cos\theta-\sin\alpha\sin\theta} = \qquad (5)$$

$$\frac{r_X\cos\theta+r_Y\sin\theta-R\sin\theta(\cos\theta-\sin\theta)+R\sin\alpha-r_V\cos(\alpha+\theta)}{-r_X\sin\theta+r_Y\cos\theta-R\cos\theta(\cos\theta-\sin\theta)+R+R\cos\alpha+r_V\sin(\alpha+\theta)}$$

The above equations in (5) can be expanded and rearranged as in the following equation:

$$r_X\cos\alpha-r_Y\sin\alpha-r_V=R(\sin\alpha+\cos\alpha)\sin\theta+R\sin\theta \qquad (6)$$

Besides, in case of translating the movable frame 14, θ=0 is satisfied, and the above equation (6) are reorganized as follows:

$$r_X\cos\alpha-r_Y\sin\alpha-r_V=0 \qquad (7)$$

In this embodiment, also, α=45° is satisfied, and the equation (7) can be abbreviated as follows:

$$r_V = \frac{(r_X-r_Y)}{\sqrt{2}} \qquad (8)$$

Thus, in this embodiment, when the image stabilizing lens 16 has its center translated to the coordinates (j, g) in response to the lens position command signal, the coil position command signals $r_X$ and $r_Y$ having their respective signal levels in proportion to the coordinates j and g are generated for the actuating coils 20a and 20b, respectively, while the coil position command signal $r_V$ is computed by applying the equation (8), for the actuating coil 20c.

The coil position command signal $r_X$ is identical with the output signal from the arithmetic operation circuit 38a in FIG. 8 while the coil position command signal $r_Y$ is identical with the output signal from the arithmetic operation circuit 38b. Similarly, the coil position command signal $r_V$ is identical with the output signal from the arithmetic operation circuit 40, which performs an arithmetic operation equivalent to the process provided in the equation (8).

Then, referring to FIG. 10, a relation of the lens position command signal with the coil position command signal in the case of rotating the movable frame 14. FIG. 10 is a diagram illustrating the coil position command signal in the case that the movable frame 14 is translated and rotated. As can be seen in FIG. 10, first the movable frame 14 is translated to cause the center of the image stabilizing lens 16 attached to the same to shift from the point Q to another point $Q_2$, and accordingly, the actuating magnets 22 mounted on the movable frame 14 are moved from the points L, M, N to points $L_2$, $M_2$, $N_2$, respectively. For such translating motion, the coil position command signals $r_X$, $r_Y$, $r_V$ are produced. The signal levels of the coil position command signals can be obtained through the aforementioned equations as in (8). Now obtained will be the command signals $r_{X\eta}$, $r_{Y\eta}$, $r_{V\eta}$ in the case where the movable frame 14 is rotated about the point $Q_2$ by an angle $\eta$ in the counterclockwise direction.

Similar to the case depicted in FIG. 9, first assuming that the coordinates of the point $Q_2$ and the contact point of the line $Q_2N_2$ with a circle of radius $r_V$ with the center N are (j, g) and (k, h), respectively, and replacing the term $\theta$ in the equation (4) with zero leads to the following relations:

$$g = r_Y$$
$$j = i = r_X$$
$$k = -R\sin\alpha + r_V\cos(\alpha + \theta) = -R\frac{1}{\sqrt{2}} + r_V\frac{1}{\sqrt{2}} \quad (9)$$

When the movable frame 14 is rotated about the point $Q_2$ by an angle $\eta$ in the counterclockwise direction, the points $L_2$, $M_2$, $N_2$ are respectively moved to points $L_3$, $M_3$, $N_3$. It is also assumed that angles at which pairs of segments $Q_2L_2$ and $Q_2L$, $Q_2M_2$ and $Q_2M$, and $Q_2N_2$ and $Q_2N$ meet are denoted by $\beta$, $\delta$, and $\gamma$, respectively. Additionally assumed is that the segments $Q_2L$, $Q_2M$, and $Q_2N$, have their respective lengths designated as U, W, and V. It is given that the coil position command signals $r_{X\eta}$, $r_{Y\eta}$, $r_{V\eta}$ have their respective signal levels equal to radii of circles having their respective center at the points L, M, N and tangential with lines $Q_2L_3$, $Q_2M_3$, and $Q_2N_3$, respectively, and therefore, the relations expressed as follows can be established:

$$r_{X\eta} = U\sin(\beta+\eta) = U(\sin\beta\cos\eta + \cos\beta\sin\eta)$$
$$r_{V\eta} = -V\sin(\gamma+\eta) = -V(\sin\gamma\cos\eta + \cos\gamma\sin\eta)$$
$$r_{Y\eta} = -W\sin(\delta+\eta) = -W(\sin\delta\cos\eta + \cos\delta\sin\eta) \quad (10)$$

$\sin\beta$, $\cos\beta$ and other terms can be replaced with the following expressions according to some mathematical relations;

$$\sin\beta = \frac{i}{U} = \frac{r_X}{U}$$
$$\cos\beta = \frac{R-g}{U} = \frac{R-r_Y}{U} \quad (11)$$

$$\sin\gamma = -\frac{r_V}{V}$$
$$\cos\gamma = \frac{\sqrt{2}(i-k)}{V} = \frac{\sqrt{2}r_X + R - r_V}{V}$$
$$\sin\delta = \frac{g}{W} = \frac{-r_Y}{W}$$
$$\cos\delta = \frac{R-i}{W} = \frac{R-r_x}{W}$$

In addition, the relations in the equations in (11) are substituted for their respective corresponding terms in the equations in (10) to eliminate the terms like $\beta$, $\gamma$, and $\delta$, formulae expressing the relations as follows are obtained:

$$r_{X\eta} = r_X\cos\eta + (R-r_Y)\sin\eta$$
$$r_{V\eta} = r_V\cos\eta - (\sqrt{2}r_X + R - r_V)\sin\eta$$
$$r_{Y\eta} = r_Y\cos\eta - (R-r_X)\sin\eta \quad (12)$$

Thus, in order to shift the movable frame 14 to a point that is determined by first translating the center of the image stabilizing lens 16 to the coordinates (j, g) and then rotating the same about the resultant point by an angle $\eta$ in the counterclockwise direction, the coil position command signals $r_X$, $r_Y$, $r_V$ are obtained through the formulae (8) and (9) above all, and then the obtained values are substituted for the corresponding terms in the formulae (12) to obtain the coil position command signals $r_{X\eta}$, $r_{Y\eta}$, $r_{V\eta}$, which are to be given for the actuating coils.

In the case where the movable frame 14 is to be rotated about the point Q by the angle $\eta$ in the counterclockwise direction without the translating motion, the terms $r_X$, $r_Y$, and $r_V$ in the formulae (12) are substituted for zero as follows:

$$r_{X\eta} = R\sin\eta$$
$$r_{V\eta} = R\sin\eta$$
$$r_{Y\eta} = -R\sin\eta \quad (13)$$

Thus, the coil position command signals $r_{X\eta}$, $r_{Y\eta}$, and $r_{V\eta}$ can be obtained through the arithmetic operations.

Next, referring to FIG. 11, an exemplary circuit of the controller 36 is described. FIG. 11 depicts an example of a circuit controlling the current that flows in the actuating coil 20a. In the circuit in FIG. 11, supplemental circuitry such as power supply lines to activate the operational amplifiers is omitted. First, as can be seen in FIG. 11, supply voltage $+V_{CC}$ and the ground are connected along with electrical resistances R7 and R8 in series as a whole. An operational amplifier OP4 has its positive input terminal connected between the electrical resistances R7 and R8. The operational amplifier OP4 has its negative input terminal connected to an output terminal of the operation amplifier OP4. In this way, the resistances R7 and R8 permit voltage at the output terminal of the operational amplifier OP4 to reach the level of the reference voltage $V_{REF}$ between the supply voltage $V_{CC}$ and the ground potential GND, so that it can be retained at that level.

On the other hand, the supply voltage $+V_{CC}$ is applied between first and second terminals of the magnetic sensor 24a. A third terminal of the magnetic sensor 24a is connected to the reference voltage $V_{REF}$. In this manner, as magnetism affecting the magnetic sensor 24a is varied, a fourth terminal of the magnetic sensor 24a accordingly varies between the levels of $+V_{CC}$ and GND.

The magnetic sensor 24a has its fourth terminal connected to a negative input terminal of an operational amplifier OP1 with a variable resistance VR2 intervening therebetween, and the variable resistance VR2 can be adjusted to regulate the gain of the output from the magnetic sensor 24a. The variable resistance VR1 has its opposite fixed terminals connected to the voltage levels of +$V_{CC}$ and GND, respectively. The variable resistance VR1 has its variable terminal connected to a negative input terminal of the operational amplifier OP1 with the electrical resistance R1 intervening between them. The variable resistance VR1 can be adjusted to regulate the offset voltage of the output from the operational amplifier OP1. Also, the operational amplifier OP1 has its input terminal connected to the reference voltage $V_{REF}$. The operational amplifier OP1 has its output terminal connected to a negative input terminal of the operational amplifier OP1 with the electrical resistance R2 intervening therebetween.

The arithmetic operation circuit 38a producing the coil position command signal related to the actuating coil 20a is connected to a positive input terminal of the operational amplifier OP3. The operational amplifier OP3 has its output terminal connected to a negative input terminal of the operational amplifier OP3. Thus, the operational amplifier OP3 serves as a buffer amplifier of the coil position command signal.

The operational amplifier OP1 has its output terminal connected to a negative input terminal of the operational amplifier OP2 with the electrical resistance R3 intervening between them. Also, the operational amplifier OP3 has its output terminal connected to a positive input terminal of the operational amplifier OP2 with the electrical resistance R4 intervening therebetween. In this manner, a difference of the output from the magnetic sensor 24a from the coil position command signal is produced from an output terminal of the operational amplifier OP2. The operational amplifier OP2 has its positive input terminal connected to the reference voltage $V_{REF}$ with an electrical resistance R5 intervening therebetween, and has its output terminal connected to the negative input terminal of the operational amplifier OP2 with an electrical resistance R6 intervening therebetween. Gains of the positive and negative outputs of the operational amplifier OP2 are defined by these electrical resistances R5 and R6.

The operational amplifier OP2 has its output terminal connected to one of the opposite ends of the actuating coil 20a, and the other end of the actuating coil 20a is connected to the reference voltage $V_{REF}$. Thus, the current equivalent to the voltage difference between the output from the operational amplifier OP2 and the reference voltage $V_{REF}$ flows in the actuating coil 20a. The current flowing in the actuating coil 20a develops magnetic field, and this causes magnetic force to affect on the actuating magnet 22, which eventually brings about a displacement of the actuating magnet 22. Such magnetic force is directed to let the actuating magnet 22 to come close to a position as instructed in the coil position command signal. Once the actuating magnet 22 is moved, the voltage output from the fourth terminal of the magnetic sensor 24a is varied. When the actuating magnet 22 reaches the position instructed in the coil position command signal, the voltages supplied to the positive and negative input terminals of the operational amplifier OP2 become equal to each other, and the current no longer flows in the actuating coil 20a.

The aforementioned operational amplifiers OP1 and OP2 in FIG. 11 are the counterparts of the magnetic sensor amplifier 42a and the differential circuit 44a in FIG. 8. Although the circuitry controlling the current to flow in the actuating coil 20a has been described, the current to flow in the actuating coil 20b is also controlled by means of the similar circuitry. Additionally, the current to flow in the actuating coil 20c can be controlled by means of the similar circuit, but in this situation, the arithmetic operation circuit 40 has its output connected to the positive input terminal of the operational amplifier OP3. The arithmetic operation circuit 40 consists of a differential amplifier functioning equivalent to the operational amplifier OP2, an electric resistance producing divided voltage in $(1/2)^{1/2}$ of the pre-process level, and the like.

With reference to FIGS. 1 and 8, the operation of a preferred embodiment of a camera 1 according to the present invention will be described. First, turning on a start switch (not shown) for an anti-vibrating function of the camera 1 allows for the actuator 10 in the lens unit 2 to begin working. The gyros 34a and 34b built in the lens unit 2 time-varyingly detect vibrations in a predetermined frequency band, and the gyro 34a produces a signal of the angular acceleration in the yawing direction to the arithmetic operation circuit 38a while the gyro 34b produces a signal of the angular acceleration in the pitching direction. The arithmetic operation circuit 38a integrates the received angular acceleration signal twice in the time quadrature process to compute a yawing angle, and the computation result is further added with a predetermined correction signal to generate the command signal of the lens position in the horizontal direction. Similarly, the arithmetic operation circuit 38b integrates the received angular acceleration signal twice in the time quadrature process to compute a pitching angle, and the computation result is added with a predetermined correction signal to generate the command signal of the lens position in the vertical direction. Time-varyingly moving the image stabilizing lens 16 to the positions that are instructed in the lens position command signal produced from the arithmetic operation circuits 38a, 38b on the time-varying basis, an image focused on the film plane F within the camera body 4 can be stabilized.

The command signal of the lens position in the horizontal direction produced from the arithmetic operation circuit 38a is transferred to the differential circuit 44a as the coil position command signal $r_X$ related to the actuating coil 20a. Similarly, the command signal of the lens position in the vertical direction produced from the arithmetic operation circuit 38b is transferred to the differential circuit 44b as the coil position command signal $r_Y$ related to the actuating coil 20b. The outputs from the arithmetic operation circuits 38a, 38b are transferred to the arithmetic operation circuit 40, and arithmetic operations as expressed in the formulae (8) enables to generate the coil position command signal $r_V$ for the actuating coil 20c.

On the other hand, the magnetic sensors 24a, 24b, and 24c respectively located inside the actuating coils 20a, 20b, and 20c produce detection signals to the magnetic sensor amplifiers 42a, 42b, and 42c, respectively. The detection signals detected by the magnetic sensors are, after respectively amplified in the magnetic sensor amplifiers 42a, 42b, and 42c, transferred to the differential circuits 44a, 44b, and 44c, respectively.

The differential circuits 44a, 44b, and 44c respectively generate voltages equivalent to the differences between the received detection signals from the magnetic sensors and the coil position command signals $r_X$, $r_Y$, and $r_V$ and respectively permit the currents in proportion to the voltages to flow in the actuating coils 20a, 20b, and 20c. As the currents flow in the actuating coils, the magnetic field in proportion to the currents is developed. By virtue of the magnetic field, the actuating magnets 22, which are disposed in the corresponding positions to the actuating coils, are forced to move closer to the positions designated by the coil position command signals $r_X$, $r_Y$, and $r_V$) respectively, thereby moving the movable frame 14. The actuating magnets 22, once reaching the designated positions by virtue of the coil position command signals, the output from the differential circuit turns to the zero level since the coil position command signals are equal to the detection signals, and the force to move the actuating magnets also becomes naught. As an external disturbance and/or an alteration in the coil position command signals cause the actuating magnets 22 to depart from the positions designated in the coil position command signals, the current flow is resumed in the actuating coils, which enables the actuating magnets 22 to regain the designated positions.

Time-varyingly repeating the aforementioned step permits the image stabilizing lens 16 attached to the movable frame 14 along with the actuating magnets 22 to follow the lens position command signal to the designated position. Thus, the image focused on the film plane F within the camera body 4 is stabilized.

In the embodiment of camera according to the present invention, since the movable frame for the image stabilizing actuator can be translated in the desired direction without using orthogonal guides leading in two different directions, and the actuator may have a simplified mechanism. Also, as a result of such a simplified mechanism, the movable frame for the actuator can reduce the weight, and this enables the actuator of a quick response.

In the embodiment of camera according to the present invention, the movable frame for the image stabilizing actuator can be translated and rotated in the desired directions within a predetermined plane.

In the embodiment of camera according to the present invention, the magnetic sensors are used to detect magnetism from the actuating magnets to determine the position of the movable frame, and therefore, the actuating magnets also versatilely serve as those for the magnetic sensors without the additional ones. Since the magnetic sensors are located inside the actuating coils, a point of action of the force applied from each actuating coil to each actuating magnet is approximately identical with a point sensed as the position of the actuating magnet by the magnetic sensor, and this enables an accurate detection of the position of the movable frame without an influence of mechanical maladjustment.

In the embodiment of the camera according to the present invention, an interval between the fixing plate and the movable member is kept constant by virtue of the steel balls, and the rolling of the steel balls between the fixed plate and the movable frame permits the movable member to move relative to the fixed plate, which eliminates affections of frictional resistance of sliding between the fixed plate and the movable frame dislocated relative to the same.

Although the embodiments of the present invention have been described, various modifications can be made to it. The present invention is applied especially to a film camera in the aforementioned embodiments, but it can be applied to any still camera or animation picture camera such as a digital camera, a video camera, and the like. Also, the present invention can be applied to a lens unit used with a camera body of any of the above-mentioned cameras. Additionally, there are applications of the invention in use as an actuator that moves an image stabilizing lens of the camera or as an actuator that moves an XY stage or the like.

Further, in the aforementioned embodiment, the actuating coils are attached to the fixed member while the actuating magnets are attached to the movable member, and instead, the actuating magnets may be attached to the fixed member while the actuating coils are attached to the movable member. Also, in the aforementioned embodiment, three pairs of the actuating coils and the actuating magnets are used, and alternatively, four or more pairs of the actuating coils and the actuating magnets may be employed. Furthermore, in the aforementioned embodiment, permanent magnets serve as the actuating magnets, and the alternative to them may be electromagnets.

In the aforementioned embodiment, magnetic sensor serves as the position sensing means to detect magnetic force from the actuating magnets and determine their respective positions, and alternatively, any position sensing sensors but the magnetic sensors may be substituted to detect the relative positions of the actuating magnets to the actuating coils.

Also, in the aforementioned embodiment, three of the steel balls 18 serve as a movable member supporting means, and alternatively, the movable member supporting means may be replaced with four or more of spherical objects. Otherwise, without using any object spherical in shape, the movable member and the fixed member may have their respective contact surfaces finished in smooth conditions to let the movable member and the fixed member in direct contact with the same slide on each other.

Additionally, in the aforementioned embodiment, the actuating coils are disposed so that pairs of the actuating coils 24$a$ and 24$b$, 24$c$ and 24$a$, and 24$b$ and 24$c$, meet each other at the central angle of 90 degrees, 135 degrees, and 135 degrees, respectively, and alternatively, the position of the actuating coil 24$c$ may be determined so that the central angle at the intersection of the actuating coil 24$b$ with the actuating coil 24$c$ is in the range as expressed in the formula 90+$\alpha$ (0≦$\alpha$≦90). Otherwise, the central angle at the intersection of the actuating coils 24$a$ and 24$b$ may be any angle other than 90 degrees as desired, and three of the actuating coils meet one another at the central angle ranging from 90 degrees to 180 degrees such as 120 degrees at all the three central angles made by three of the actuating coils.

Moreover, in the aforementioned embodiment, the magnetic neutral axes of the actuating magnets extend all in the radial direction, and alternatively, they may be directed in any way as desired. Preferably, at least one of the actuating magnets is disposed with its magnetic neutral axis extended in the radial direction.

FIG. 12 depicts a modification of the aforementioned embodiment of the present invention where the magnetic neutral axes of the actuating magnets 22 respectively in pairs with the actuating coils 24$a$ and 24$b$ extend as the tangential line to the circle centered at the point Q while the magnetic neutral line of the remaining magnet 22 in a pair with the actuating coil 24$c$ extends coincidental with a radius of the circle. Although omitted in the drawings, the actuating coils, 24$a$, 24$b$, 24$c$ are located in the points L, M and N, respectively. In this example, the coil position command signals $r_X$, $r_Y$, and $r_V$ are produced in relation with the actuating coils 24$a$, 24$b$ and 24$c$ to instruct where to move those magnets from their respective current positions L, M, and N. Due to the coil position command signals, the midpoints of the magnetic neutral axes of the actuating magnets 22 on the points L, M, N in the case of the movable frame 14 located in its neutral position are shifted to the points $L_4$, $M_4$ and $N_4$, respectively, and simultaneously, the center of the image stabilizing lens 16 is shifted from the point Q to the point $Q_3$.

In this modification, the coil position command signal $r_X$, namely, the horizontal component of the lens position command signal is provided to the actuating coil 24$b$ on the point M while the coil position command signal $r_Y$, namely, the vertical component of the lens position command signal is provided to the actuating coil 24$a$ on the point L. Also, in the case depicted in FIG. 12, substituting the coil position command signals $r_X$ and $r_Y$ for the corresponding terms in the formula (8), the coil position command signal $r_Y$ thus obtained is given in relation with the actuating coil 24c, which resultantly, causes the point Q to translate by $-r_X$ and $+r_Y$ along the X- and Y-axes, respectively.

Then, referring to FIG. 13, another modification of the embodiment according to the present invention will be described. This embodiment is different from the aforementioned ones in that an actuator 45 has a locking mechanism anchoring the movable frame 14 to the fixed plate 12 when there is no need of controlling the movable frame 14.

As can be seen in FIG. 13, the actuator 45 in this embodiment is provided with three engagement projections 14a in the outer circumference of the movable frame 14. The fixed plate 12 is also provided with an annular member 46 surrounding the movable frame 14, and the annular member 46 has three engagement elements 46a in the inner circumference thereof so as to mate with the engagement projections 14a, respectively. In addition, the movable frame 14 is provided with three movable member holder magnets 48 in its outer circumference. The annular member 46 has three fixed plate holder magnets 50 in positions corresponding to the movable member holder magnets 48 in the inner circumference, so that both groups of the magnets develop magnetic force and affect each other on the one-on-one basis. Moreover, a manual locking element 52 extends from the outside of the annular member 46 inwardly in the radial direction, and it can move along the circumference direction of the annular member 46. The manual locking element 52 has its tip machined in a U-shaped dent 52a. An engagement pin 54 resides on the outer circumference of the movable frame 14 so that it is received in the U-shaped dent 52a and engaged with the manual locking element 52.

An operation of the actuator 45 will be detailed. First, the movable frame 14 of the actuator 45 is rotated in the counterclockwise direction in FIG. 13, and as a consequence, the engagement projections 14a in the outer circumference of the movable frame 14 respectively come in engagement with the engagement elements 46a in the annular member 46, thereby anchoring the movable frame 14 to the fixed plate 12. Additionally, the movable member holder magnets 48 residing in the movable frame 14 and the fixed member holder magnets 50 in the annular member 46 hardly affect each other in the situation as shown in FIG. 13. As the movable frame 14 is rotated in the counterclockwise direction and carries the movable member holder magnets 48 closer to the fixed member holder magnets 50, the fixed member holder magnets 50 applies magnetic force to the movable frame 14 to rotate it in the clockwise direction. Repelling the magnetic force, the movable frame 14 is further rotated in the counterclockwise direction till the movable member holder magnets 48 pass by the fixed member holder magnets 50, and consequently, the fixed member holder magnets 50 applies magnetic force to the movable frame 14 to rotate it in the counterclockwise direction. The magnetic force urges the engagement projections 14a to press themselves against the engagement elements 46a, and thus, the engagement projections 14a and the engagement elements 46a remain mated with each other. In this way, during stopping the power supply to the actuator 45, the stable engagement of the engagement projections 14a and the engagement elements 46a is guaranteed, the movable frame 14 being anchored to the fixed plate 12.

When the manual locking element 52 is manually rotated in the counterclockwise direction in FIG. 13, the engagement pin 54 on the movable frame 14 is hooked in the U-shaped dent 52a, and the movable frame 14 is also rotated in the counterclockwise direction. In this manner, the engagement projections 14a and the engagement element 46a can be manually get tied with each other. When the manual locking member 54 is manually rotated reversely, or in the clockwise direction, the movable frame 14 is rotated in the clockwise direction, and this force the engagement projections 14a and the engagement elements 46a to disconnect from each other.

The actuator in this embodiment is capable of rotating the movable frame, and this facilitates the implementation of the locking mechanism as in this modification.

BRIEF DESCRIPTIONS OF THE DRAWINGS

Figure 1:
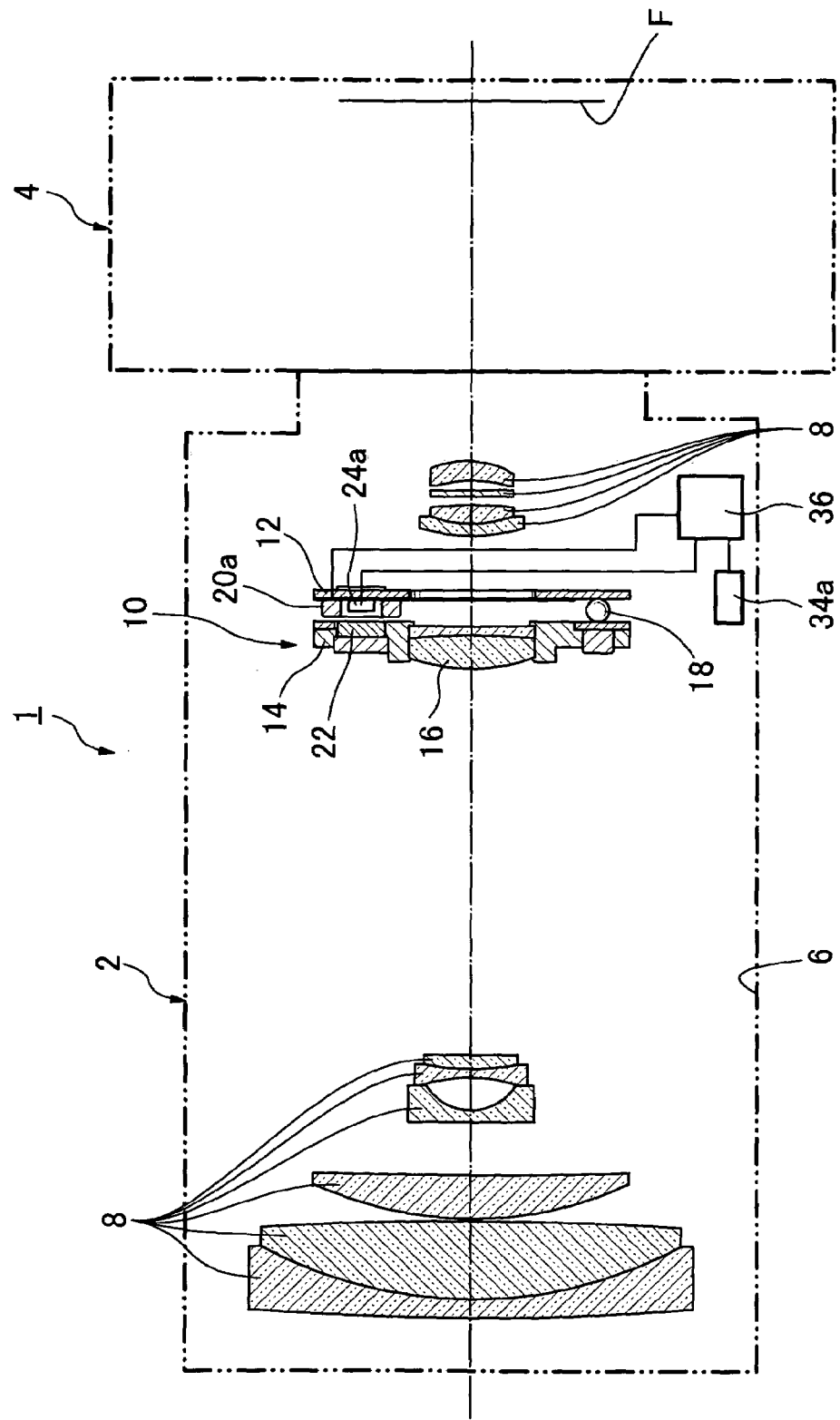
FIG. 1 is a sectional view of an embodiment of a camera according to the present invention.
Figure 2:
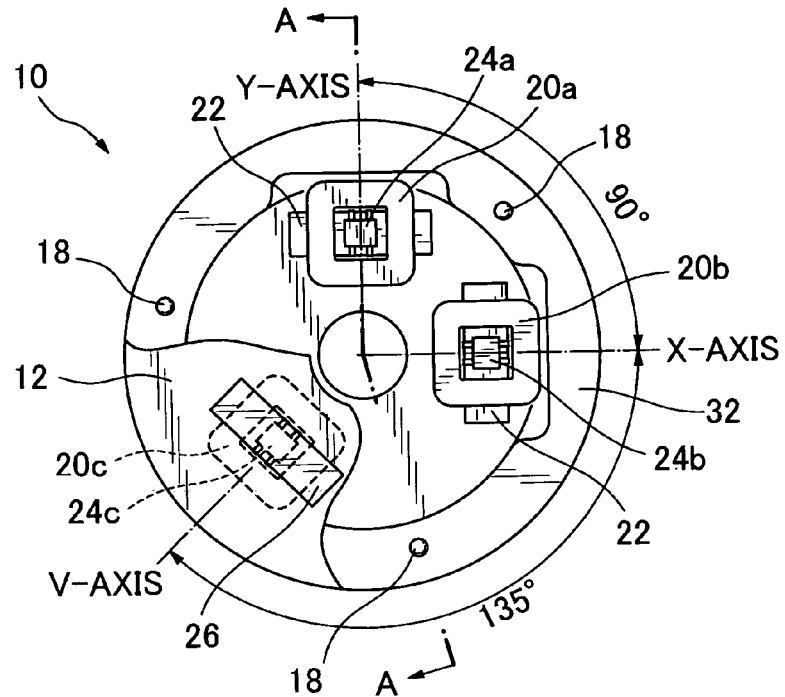
FIG. 2 is a partially cut-out frontal partial sectional view showing an actuator used in the embodiment of the camera according to the present invention.
Figure 3:
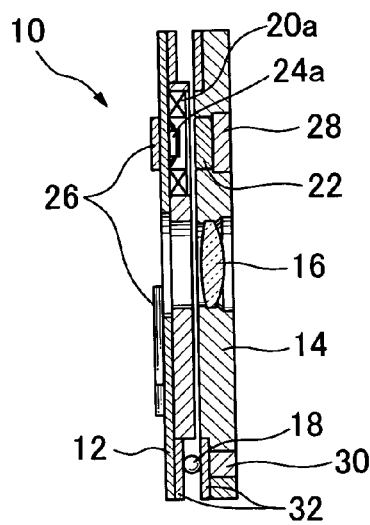
FIG. 3 is a cross-sectional view taken along the line A-A in FIG. 2, showing the actuator used in the embodiment of the camera according to the present invention.
Figure 4:
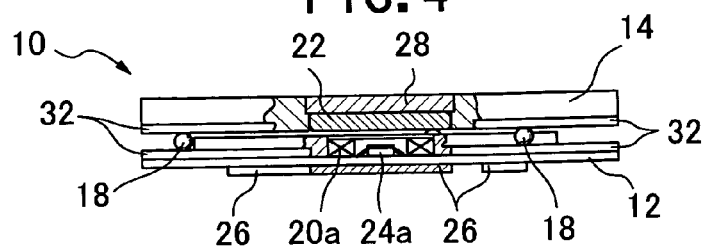
FIG. 4 is a sectional view showing an upper portion of the actuator used in the embodiment of the camera according to the present invention.
Figure 5A:
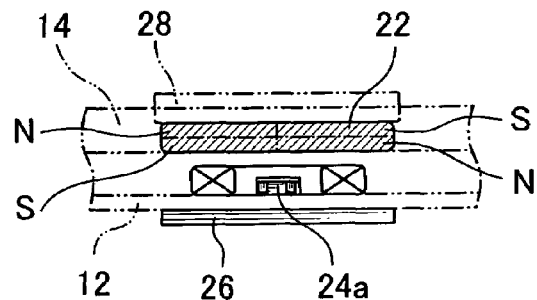
Figure 5B:
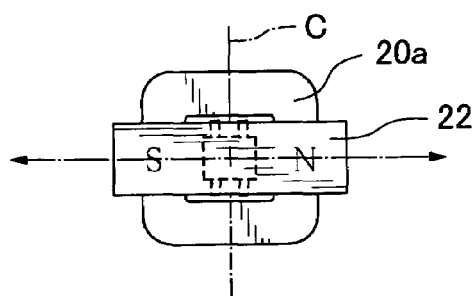
Figure 6:
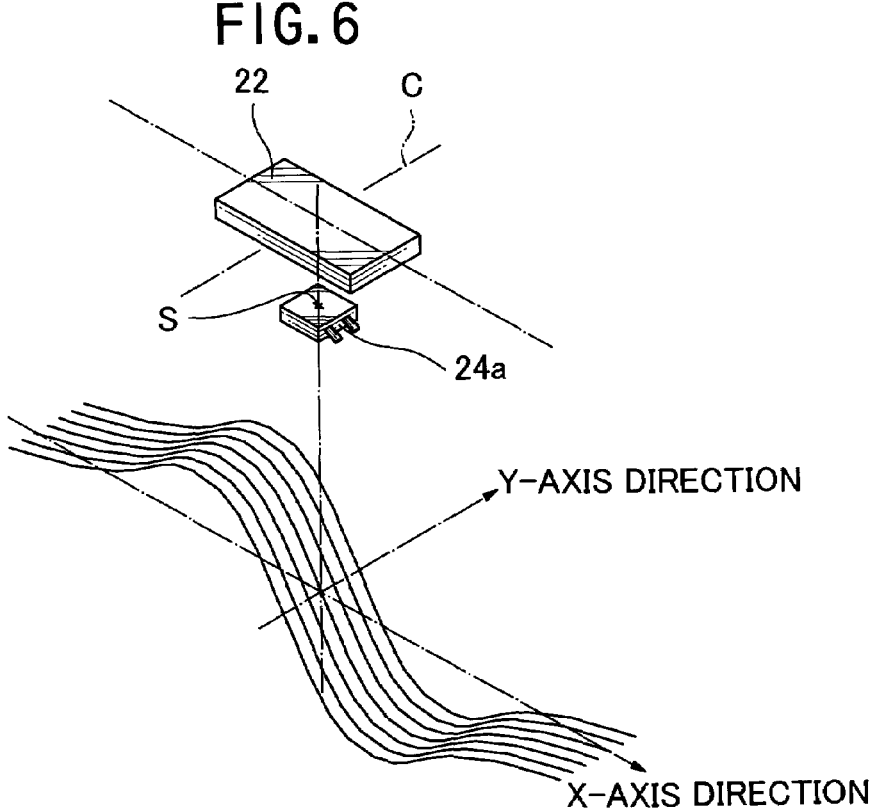
Figure 7A:
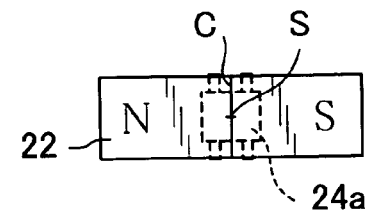
Figure 7B:
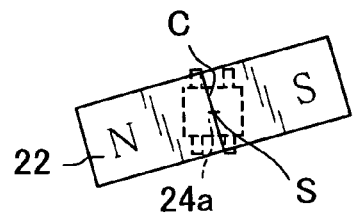
Figure 7C:
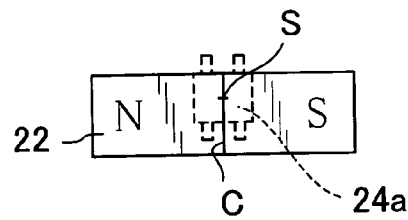
Figure 7D:
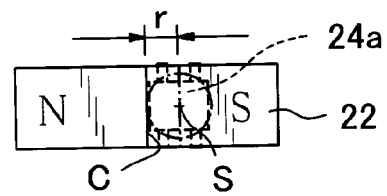
Figure 7E:
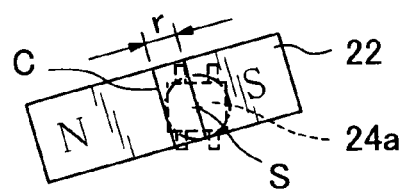
Figure 7F:
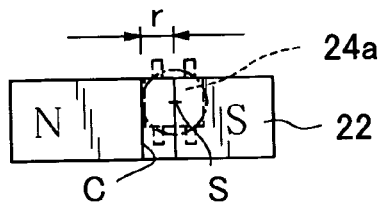
Figure 8:
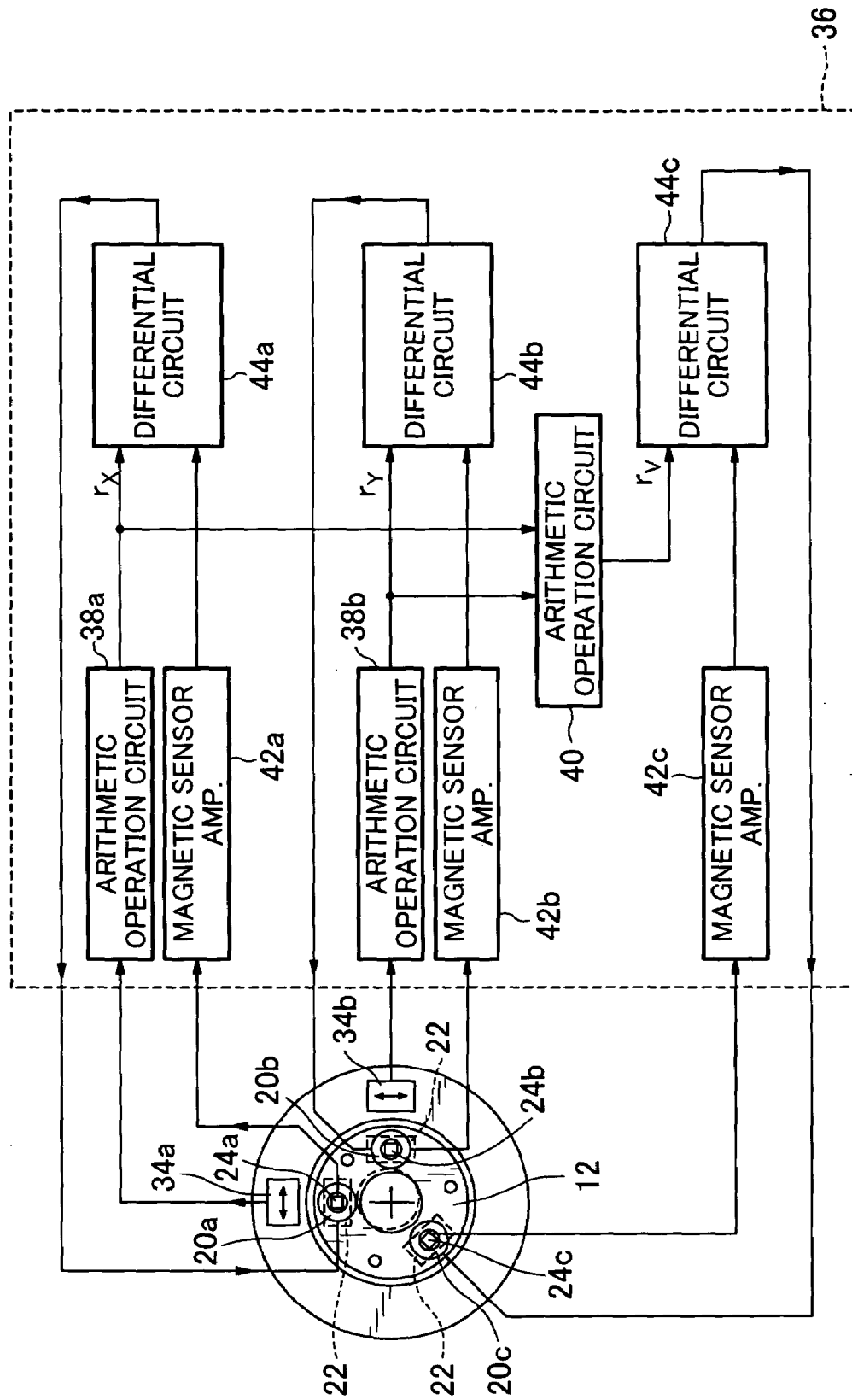
Figure 9:
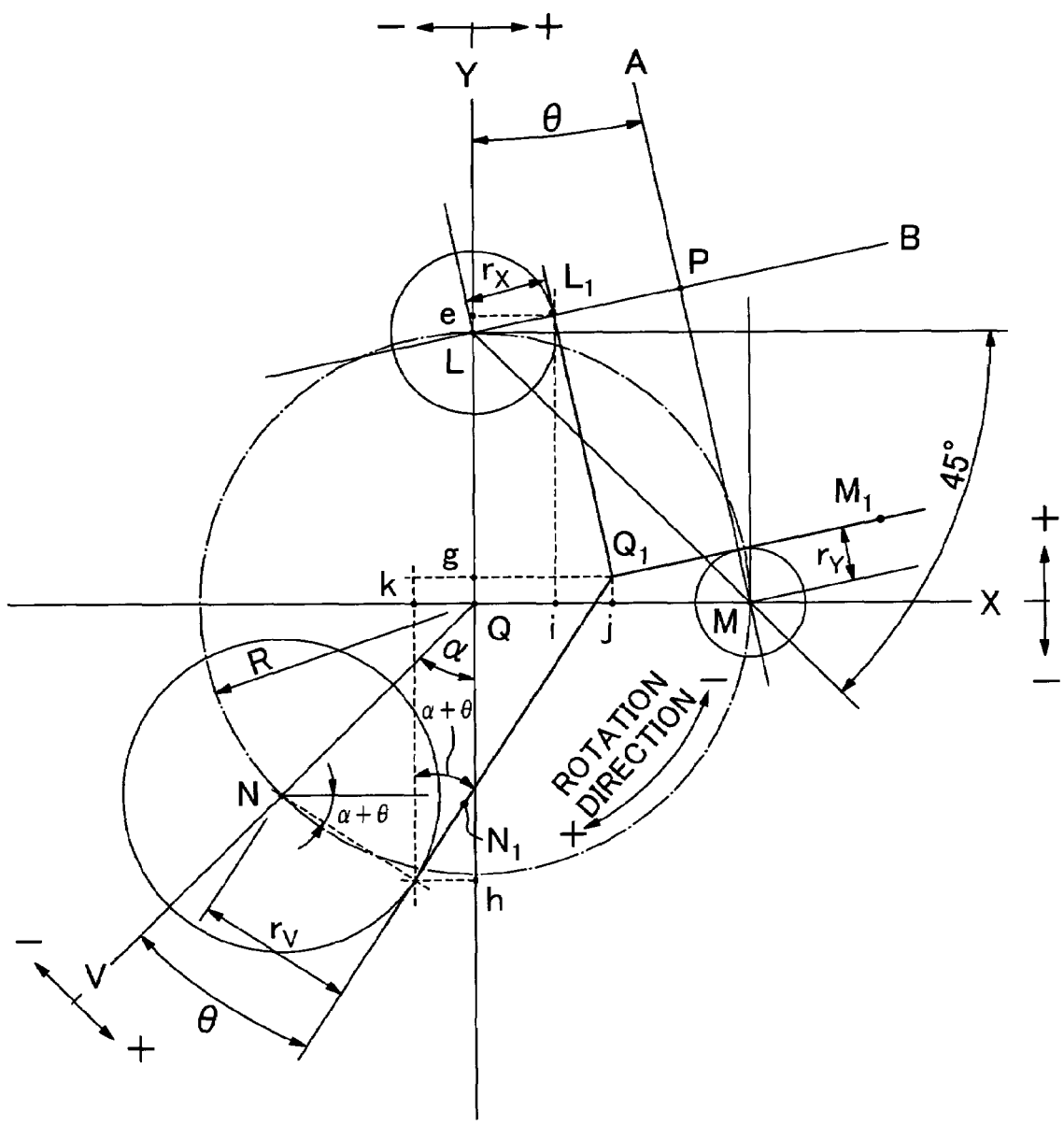
Figure 10:
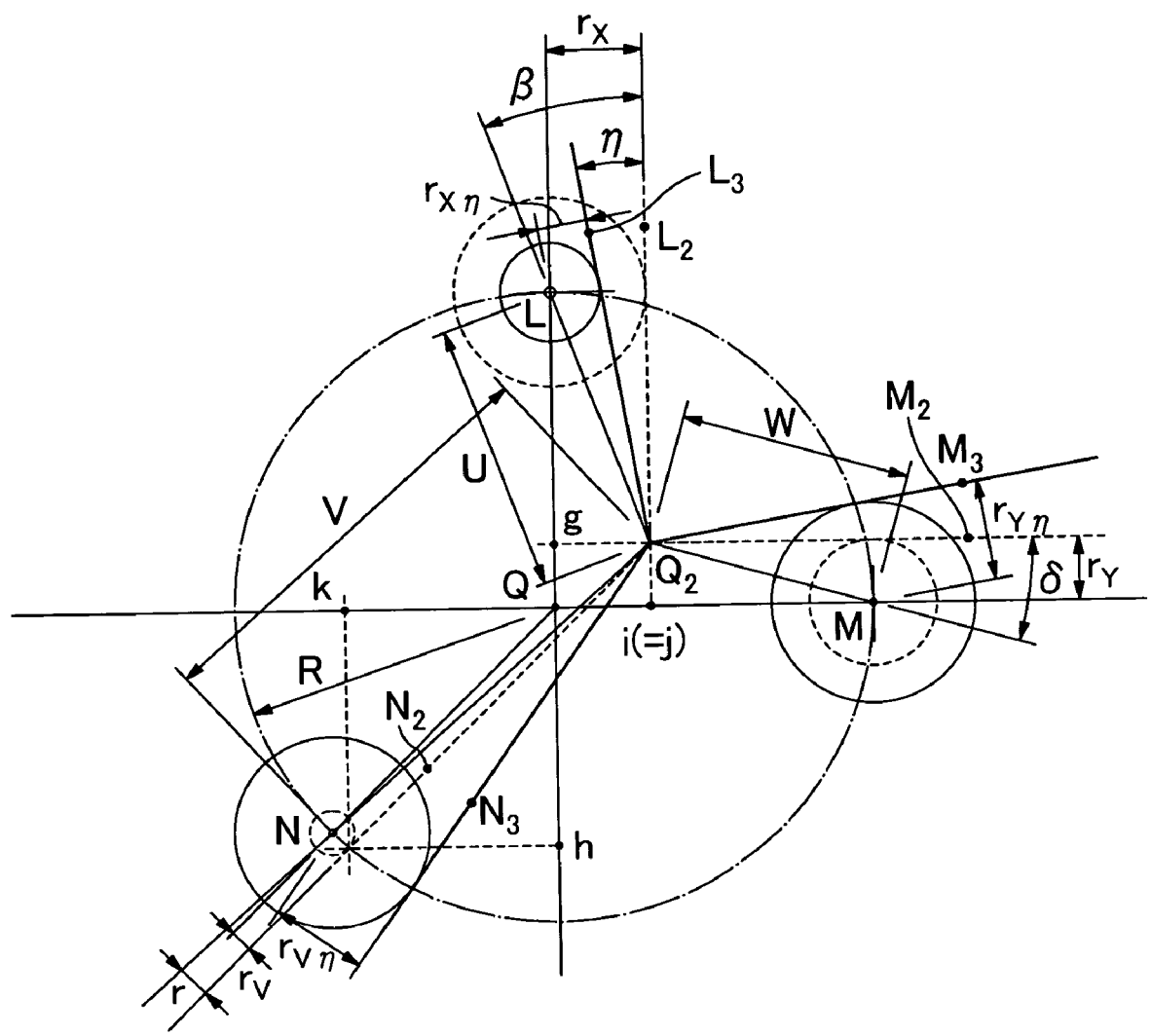
Figure 11:
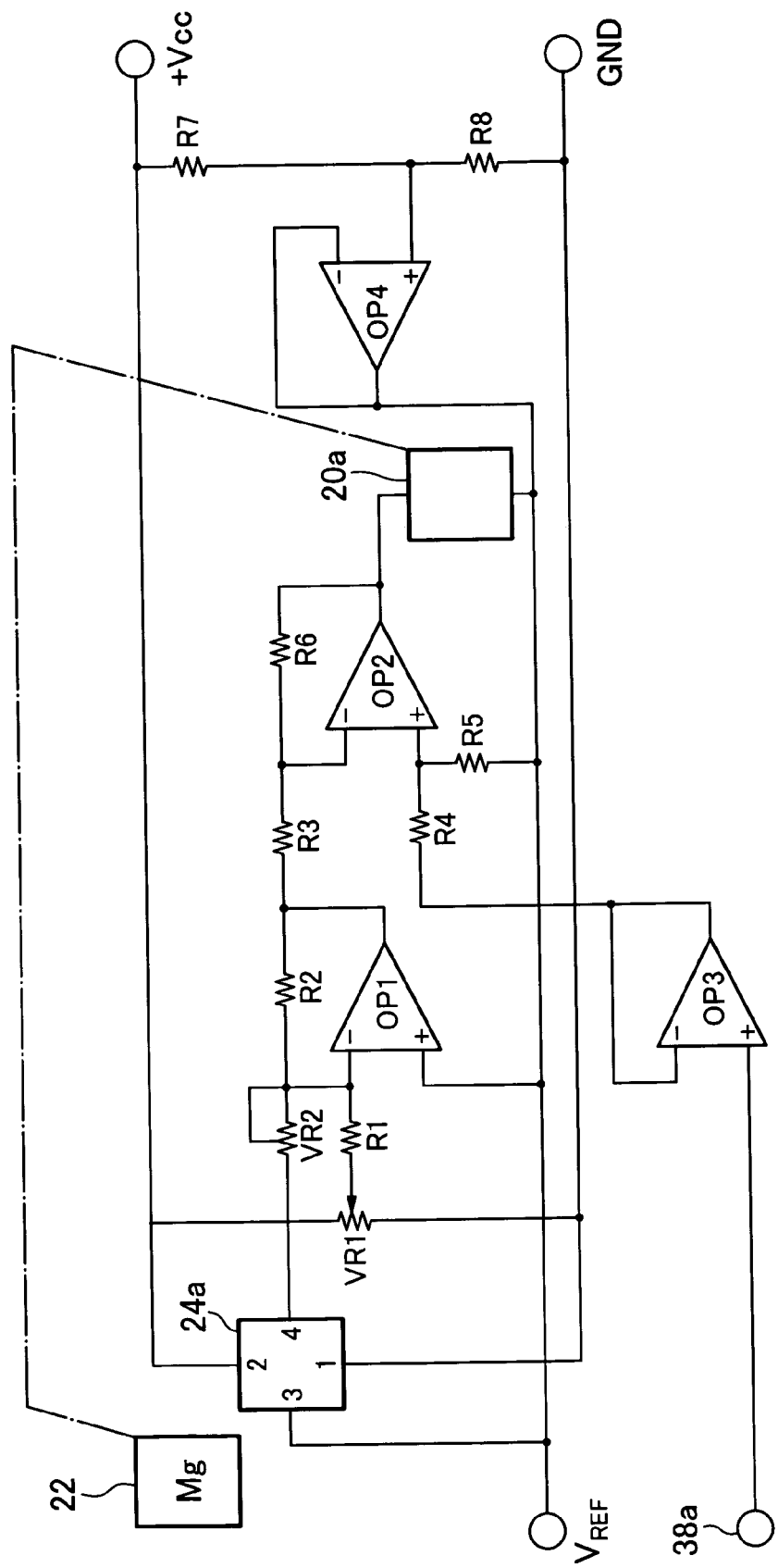
Figure 12:
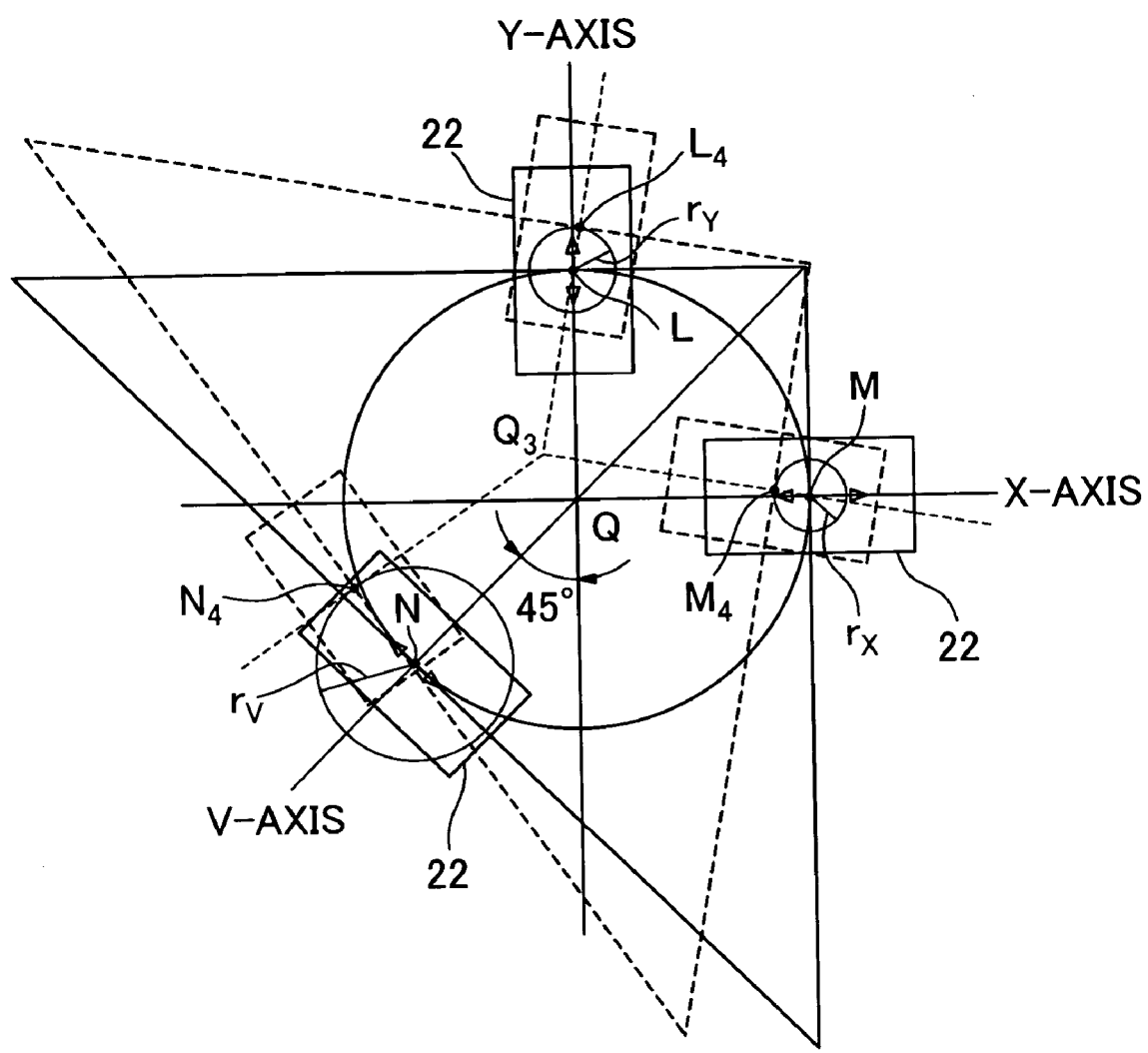
Figure 13:
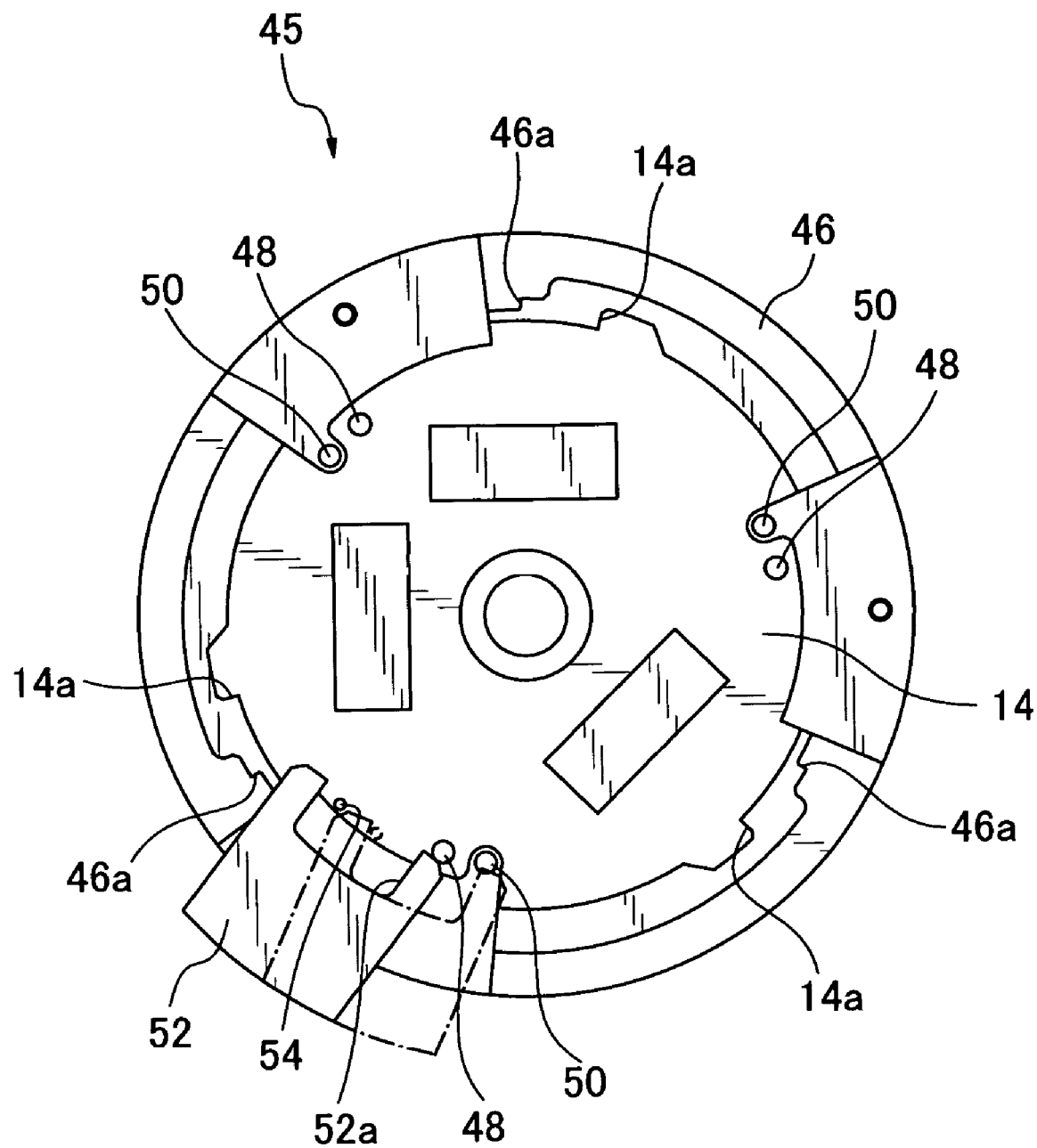

FIGS. 5(a) and 5(b) are partially enlarged top plan and frontal views illustrating mutual relations of actuating coils, actuating magnets, back yokes, and attracting yokes;

FIGS. 6 and 7 are diagrams illustrating a relation between the movement of the actuating magnet and the signals generated by the magnetic sensor;

FIG. 8 is a block diagram illustrating the signal process on the controller;

FIG. 9 is a diagram illustrating a positional relation of the actuating coils disposed on the fixed plate and three actuating magnets disposed on the movable frame;

FIG. 10 is a diagram illustrating coil position command signals upon translating and rotating a movable frame;

FIG. 11 is a circuit diagram showing an example of a circuit controlling current to let it flow in the actuating coils;

FIG. 12 is a modification of the embodiment of the actuator according to the present invention; and FIG. 13 is another modification of the embodiment of the actuator according to the present invention.

[DESCRIPTIONS OF THE REFERENCE NUMERALS]

| | |
|---|---|
| 1 | Camera |
| 2 | Lens Unit |
| 4 | Camera Body |
| 8 | Photographing Lens |
| 10 | Actuator |
| 12 | Fixed Plate |
| 14 | Movable Plate |
| 16 | Image Stabilizing Lens |
| 18 | Steel Ball |
| 20a | Actuating Coil |
| 20b | Actuating Coil |
| 20c | Actuating Coil |
| 22 | Actuating Magnets |
| 24a | Magnetic Sensor |
| 24b | Magnetic Sensor |
| 24c | Magnetic Sensor |
| 26 | Attracting yokes |
| 28 | Back Yokes |
| 30 | Attracting Magnets |
| 32 | Steel Ball Contacts |
| 34a | Gyro |
| 34b | Gyro |
| 36 | Controller |
| 38a | Arithmetic Operation Circuit |
| 38b | Arithmetic Operation Circuit |

-continued

| [DESCRIPTIONS OF THE REFERENCE NUMERALS] | |
|---|---|
| 40 | Arithmetic Operation Circuit |
| 42a | Magnetic Sensor Amplifier |
| 42b | Magnetic Sensor Amplifier |
| 42c | Magnetic Sensor Amplifier |
| 44a | Differential Amplifier |
| 44b | Differential Amplifier |
| 44c | Differential Amplifier |
| 45 | Modified Actuator |
| 46 | Annular Member |
| 46a | Engagement Elements |
| 48 | Movable Member Holder Magnets |
| 50 | Fixed Member Holder Magnets |
| 52 | Manual Locking element |
| 52a | U-shaped Dent |
| 54 | Engagement Pin |

The invention claimed is:

1. An actuator comprising:
a fixed member;
a movable member;
movable member supporting means for supporting the movable member so as to permit the movable member to move to an arbitrary position in a plane in parallel with the fixed member;
at least three actuating coils attached to either one of the fixed member and the movable member, the at least three actuating coils driving the movable member;
actuating magnets attached to the remaining one of the fixed member and the movable member in positions corresponding to the actuating coils so as to apply magnetic force to the corresponding actuating coils to affect each other when current flows in the actuating coils;
position sensing means for detecting a relative position of the movable member to the fixed member; and
control means for producing coil position command signals on the basis of a command signal for instructing the at least three actuating coils where the movable member is to be moved, and for independently controlling the drive current to flow in each of the actuating coils in response to the coil position command signal and the position data detected by the position sensing means.

2. The actuator according to 1, wherein the position sensing means is a magnetic sensor that detects a variation in magnetism, and it resides in position corresponding to each of the actuating magnets so as to detect the varied position of each actuating magnet.

3. The actuator according to 2, wherein the magnetic sensor is located inside each of the actuating coils.

4. The actuator according to 1, wherein the movable member supporting means is comprised of three spherical members interposed between the opposing faces of the fixed member and the movable member.

5. The actuator according to 1, wherein the actuating magnets are positioned on a predetermined circle, and at least one of the actuating magnets is arranged so that its magnetic neutral axis is approximately directed in a radial direction of the circle.

6. The actuator according to 1, wherein there are three of the actuating coils, and these three actuating coils are disposed on a predetermined circle, each of the actuating coils being angularly away from each other by a central angle ranging from 90 degrees to 180 degrees.

7. The actuator according to 6, wherein the actuating magnets arranged on the predetermined circle in positions corresponding to the actuating coils, so that magnetic neutral axes of the actuating magnets are approximately directed to radial direction of the circle, and the control means, upon receiving the command signal to rotate the movable member, produces the coil position command signal of the same level to the actuating coils so as to permit the movable member to rotate about the center of the circle on which the actuating magnets are disposed.

8. The actuator according to 1, wherein there are three of the actuating coils, namely, first, second and third actuating coils, and these three actuating coils are disposed on a circle centered at a predetermined point so that they are angularly separated from each other at central angles of 90 degrees between the first and second actuating coils, (90+α) degrees between the second and third actuating coils, and (180−α) degrees between the third and first actuating coils where $0 \leq \alpha \leq 90$ is satisfied.

9. The actuator according to 8, wherein the actuating magnets are disposed on a predetermined circle in positions corresponding to the first, second and third actuating coils, so that magnetic neutral axes of the actuating magnets are approximately directed to radial direction of the circle, and the control means, upon receiving the command signal to translate the movable member, produces a coil position command signal $r_x$ related to the first actuating coil, a coil position command signal $r_y$ related to the second actuating coil, and a coil position command signal $r_v = r_x \cos \alpha - r_y \sin \alpha$ related to the third actuating coil to induce an only translation motion of the movable member.

10. An actuator for moving an image stabilizing lens, comprising:
a fixed member;
a movable member for carrying an image stabilizing lens having an optical axis;
movable member supporting means for supporting the movable member so as to permit the movable member to move to an arbitrary position in a plane in parallel with the fixed member;
drive means for translating the movable member in a plane in parallel with the fixed member and rotating the movable member about an axis parallel with the optical axis of the image stabilizing lens relative to the fixed member;
vibration sensing means for detecting vibrations;
calculation means for calculating an amount of translation motion of the movable member and an angle of rotation about an axis-parallel with the optical axis of the image stabilizing lens on the basis of the vibrations detected by the vibration sensing means; and
control means for controlling the drive means on the basis of the amount of translation motion and the angle of rotation calculated by the calculation means.

11. A lens unit comprising:
a lens barrel;
a photographing lens housed in the lens barrel;
fixed member secured to the lens barrel;
an image stabilizing lens;
a movable member carrying the image stabilizing lens;
movable member supporting means for supporting the movable member so as to permit the movable member to move to an arbitrary position in a plane in parallel with the fixed member;
at least three actuating coils attached to either one of the fixed member and the movable member, the at least three actuating coils driving the movable member;
actuating magnets attached to the remaining one of the fixed member and the movable member in positions corresponding to the actuating coils for applying magnetic force to the corresponding actuating coils to affect each other when current flows in the actuating coils;

position sensing means for detecting a relative position of the movable member to the fixed member;

vibration sensing means for detecting vibrations of the lens barrel;

a lens position command signal generating means for generating a lens position command signal to instruct where the image stabilizing lens is to be moved on the basis of a detection signal from the vibration sensing means; and control means for producing coil position command signals related to the actuating coils on the basis of the lens position command signal from the lens position command signal generating means, and for independently controlling drive current to flow in the actuating coils in response to the coil position command signal and the position data detected by the position sensing means.

12. A camera having a lens unit as defined in 11.

13. A lens unit comprising:

a lens barrel;

a photographing lens housed in the lens barrel;

a fixed member attached to the lens barrel;

an image stabilizing lens;

a movable member carrying the image stabilizing lens;

movable member supporting means for supporting the movable member so as to permit the movable member to move to an arbitrary position in a plane in parallel with the fixed member;

drive means for translating the movable member in a plane in parallel with the fixed member and rotating the movable member about an axis parallel with the optical axis of the image stabilizing lens relative to the fixed member in the plane in parallel with the fixed member;

vibration sensing means for detecting vibrations;

calculation means for calculating an amount of translation motion of the movable member and an angle of rotation about an axis-parallel with the optical axis of the image stabilizing lens on the basis of the vibrations detected by the vibration sensing means; and control means for controlling the drive means on the basis of the amount of translation motion and the angle of rotation calculated by the calculation means.

14. A camera having a lens unit as defined in 13.

* * * * *